(12) United States Patent  (10) Patent No.: US 6,598,823 B1
Fujii et al.  (45) Date of Patent: Jul. 29, 2003

(54) SEAT BELT RETRACTOR (75) Inventors: Hiroaki Fujii, Tokyo (JP); Hitoshi Fujita, Tokyo (JP)

(73) Assignee: Takata Corporation, Tokyo (JP)

( * ) Notice: Subject to any disclaimer, the term of this patent is extended or adjusted under 35 U.S.C. 154(b) by 16 days.

(21) Appl. No.: 09/697,591

(22) Filed: Oct. 27, 2000

Related U.S. Application Data (60) Provisional application No. 60/162,138, filed on Oct. 29, 1999.

(30) Foreign Application Priority Data

Nov. 11, 1999 (JP) ............................................. 11-320875
Sep. 11, 2000 (JP) ......................................... 2000-275171

(51) Int. Cl.$^7$ ............................................. B65H 75/48
(52) U.S. Cl. ................................................. 242/390.8
(58) Field of Search ......................... 242/390.8, 390.9, 242/379.2, 374; 180/271, 272; 206/701, 706, 707; 254/362; 280/801.1, 802, 807; 297/468, 469, 477; 269/903

(56) References Cited

U.S. PATENT DOCUMENTS

| | | | | |
|---|---|---|---|---|
| 4,809,925 A | * | 3/1989 | Takada | ....................... 242/107 |
| 5,495,995 A | * | 3/1996 | Domonique et al. | ..... 242/390.1 |
| 5,950,817 A | * | 9/1999 | Iwamoto et al. | ............ 206/204 |
| 6,149,093 A | * | 11/2000 | Kwag | ........................ 242/372 |
| 6,285,556 B1 | * | 9/2001 | Guth et al. | ................. 361/752 |
| 6,447,012 B2 | * | 9/2002 | Peter et al. | ................. 280/806 |
| 2001/0030255 A1 | * | 10/2001 | Peter | .......................... 242/383 |
| 2002/0011537 A1 | * | 1/2002 | Durrstein et al. | ........ 242/390.8 |

FOREIGN PATENT DOCUMENTS

| | | | | |
|---|---|---|---|---|
| DE | 3402245 A1 | * | 7/1985 | ........... B60R/22/36 |
| JP | 11-320875 | | 11/1999 | ............ B41J/2/045 |
| JP | 130377 A1 | * | 5/2001 | ........... B60R/22/48 |
| JP | 2001-143574 | | 5/2001 | |

* cited by examiner

Primary Examiner—Donald P. Walsh
Assistant Examiner—Mark J Beauchaine
(74) Attorney, Agent, or Firm—Foley & Lardner (57) ABSTRACT

To provide a seatbelt retractor in which wiring of lead wires in a cover is not required. Instead, a circuit board and the like can be positioned accurately, and the circuit board is sufficiently protected during the mounting of mechanical components. A circuit board is anchored to a groove of an inner cover mounted on a retainer so that the inner cover covers the circuit board at the periphery of the inner cover with rotation axles and pivot mating with mating holes, respectively, at ends thereof.

11 Claims, 7 Drawing Sheets

SEAT BELT RETRACTOR

This application claims the benefit of and priority to U.S. Provisional Application No. 60/162,138, filed Oct. 29, 1999, the entire disclosure of which is hereby incorporated by reference in its entirety.

BACKGROUND OF INVENTION

1. Field of Invention

The present invention relates to seatbelt retractors. In particular, the present invention relates to an electrical seatbelt retractor including a motor for driving a spool to rotate.

2. Description of the Related Art

A seatbelt retractor functions to spool a seatbelt drawn out too far when a passenger is seated, draws the seatbelt, and couples a tongue of the seatbelt with a buckle device.

Certain known seatbelt retractors use a return spring to wrap the seatbelt around a spool. When fastening the seatbelt, a passenger draws the seatbelt which is urged by the return spring, couples the tongue with a buckle, and releases the seatbelt. The seatbelt drawn out too far is retracted by a return spring force until a webbing of the seatbelt fits the passenger. Such a seatbelt retractor must satisfy the following conditions: (1) the excess webbing drawn out must be reliably spooled until the seatbelt fits the passenger, and when the passenger stops fastening the seatbelt, the webbing drawn out is reliably retracted by the seatbelt retractors; and, (2) the seatbelt is fastened so that the passenger does not have the sensation of being excessively restrained at the chest and the like.

However, a problem has been found in retractors using only an urging force of a return spring. When a return spring having a small urging force is used so as to reduce the oppressing sensation at the chest of the passenger by fastening the seatbelt, the retracting force for spooling (retracting) the webbing decreases, thereby reducing the performance in operation and retraction. On the other hand, when a return spring having a large urging force is used so as to secure a sufficient retracting force for spooling the webbing, the sensation of the passenger of being pressed at the chest when fastening the seatbelt increases excessively.

SUMMARY OF THE INVENTION

Accordingly, an object of the present invention is to provide a seatbelt retractor in which it is not necessary to wire lead wires in a cover included in the seatbelt retractor.

Another object of the present invention is to provide a seatbelt retractor in which a circuit board and the like can be positioned accurately.

Still another object of the present invention is to provide a seatbelt retractor in which mechanical components can be mounted on a retainer after a circuit board is mounted on the retainer, without directly touching the circuit board previously mounted.

According to the present invention, a seatbelt retractor, which includes a spool for spooling a webbing, a motor for driving the spool to rotate in a direction to spool the webbing, and a power transmission structure for transmitting the rotational driving force of the motor to the spool, comprises a circuit board provided with a circuit for controlling the rotation of the motor, and connectors for feeding current; a rotational direction determining unit for determining the rotational direction of the spool; and a retainer mounted with the motor, the power transmission structure, the circuit board, and the rotational direction determining unit. The tabular retainer is provided at a surface thereof with the power transmission structure, the circuit board, and the rotational direction determining unit. An outer cover is mounted on the retainer so as to cover the surface of the retainer including the power transmission structure, the circuit board, and the rotational direction determining unit.

In the seatbelt retractor, the circuit board is provided with the connectors, whereby wiring of lead wires in a cover can be eliminated by mounting the circuit board on the retainer so that the connectors extend toward the outside of the cover.

When the rotational direction determining unit includes a limit switch, lead wires of the limit switch can be eliminated by providing the limit switch on the circuit board. By mounting the limit switch on the circuit board via a resilient member such as a coil spring, a large stress applied to the limit switch can be suppressed.

According to the present invention, an inner cover for covering the circuit board may be provided, which is covered by the outer cover. With this arrangement, when mechanical components are mounted after the circuit board is mounted on the retainer, the circuit board is prevented from being touched by hands, tools, mechanical components, and the like because the circuit board is covered by the inner cover.

In this case, connector-passing openings are preferably provided in the inner cover so that the connectors extending from an edge of the circuit board pass through the connector-passing openings and extend toward the outside of the inner cover.

According to the present invention, the circuit board may be either anchored to a groove formed in the inner cover or be clamped by the retainer and the inner cover, whereby the circuit board can be positioned accurately.

DETAILED DESCRIPTION OF THE PREFERRED EMBODIMENTS

Figure 1:
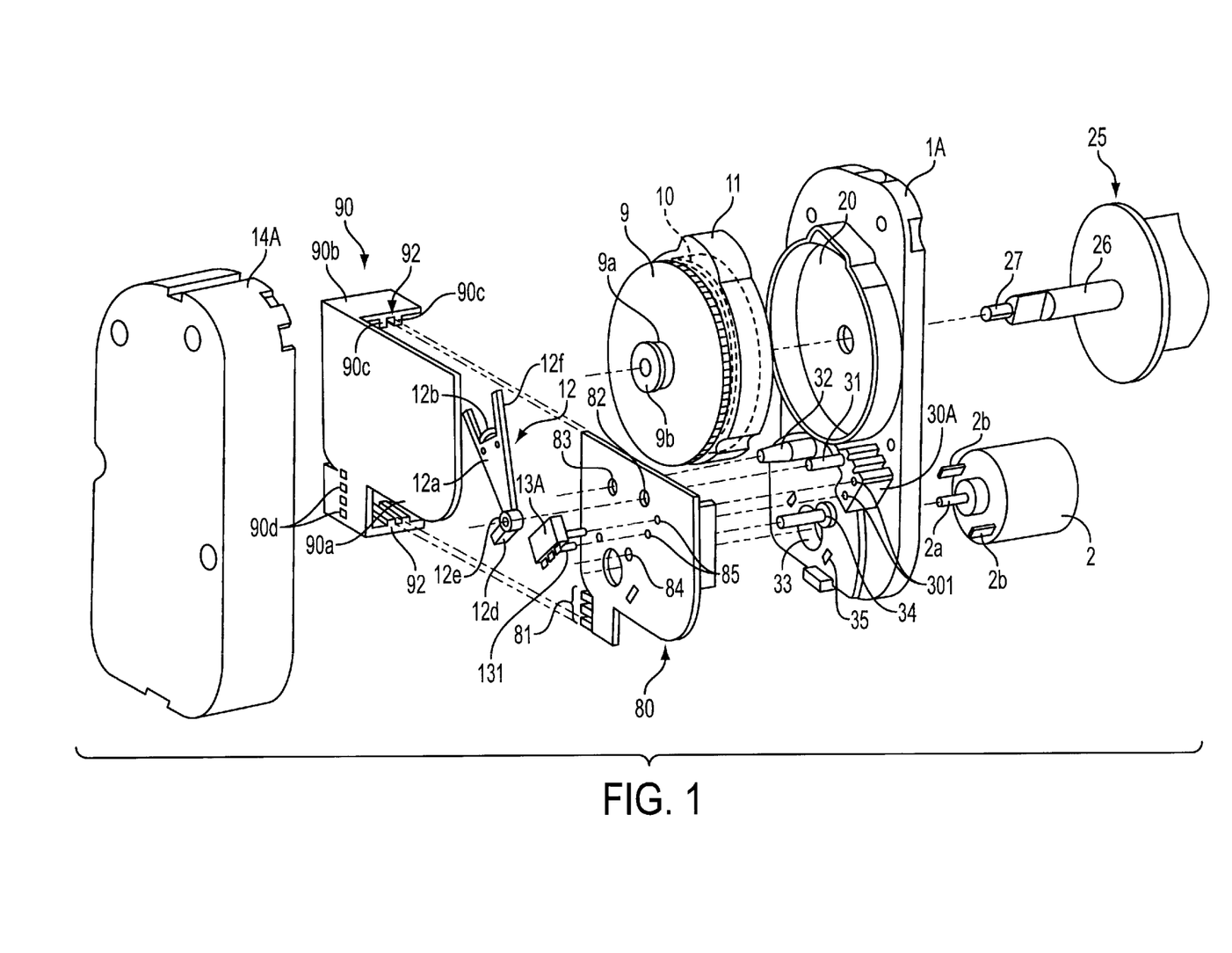
FIG. 1 is an exploded perspective view of a seatbelt retractor according to an embodiment of the present invention.
Figure 2:
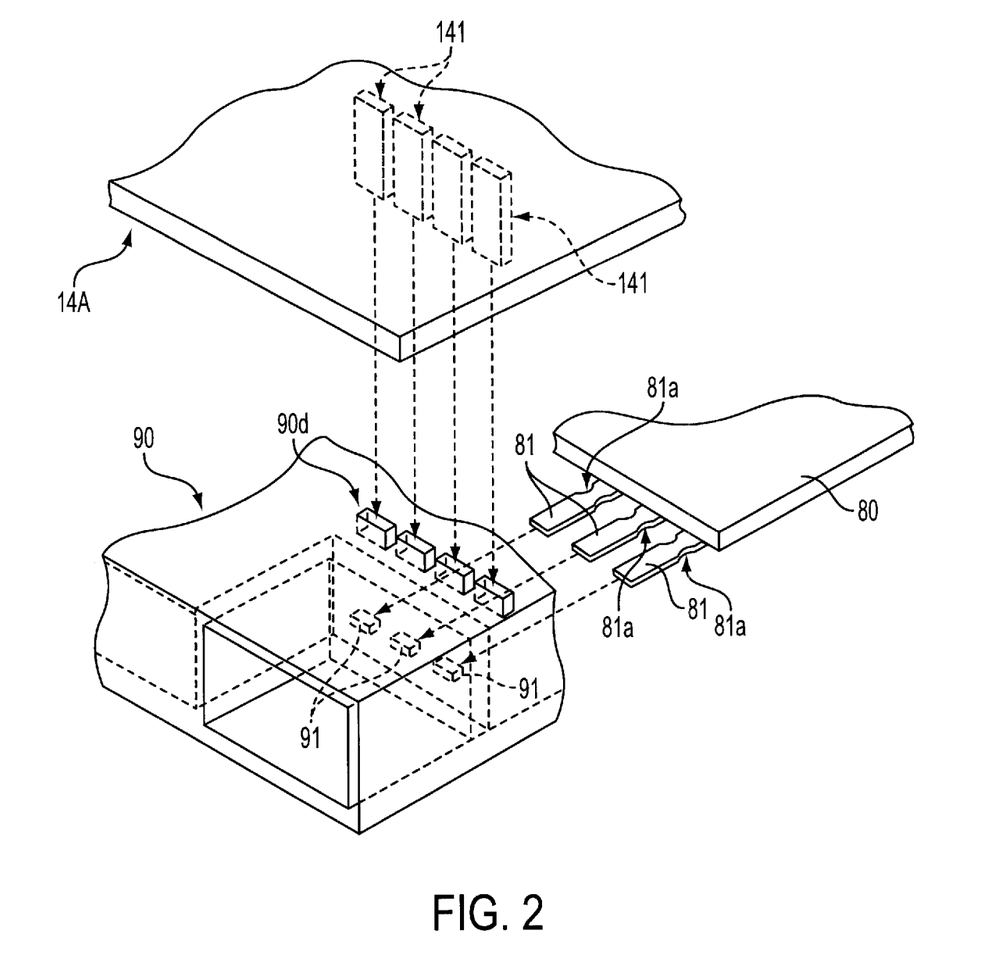
FIG. 2 is an exploded perspective view of a connector of the seatbelt retractor shown in FIG. 1.
Figure 3A:
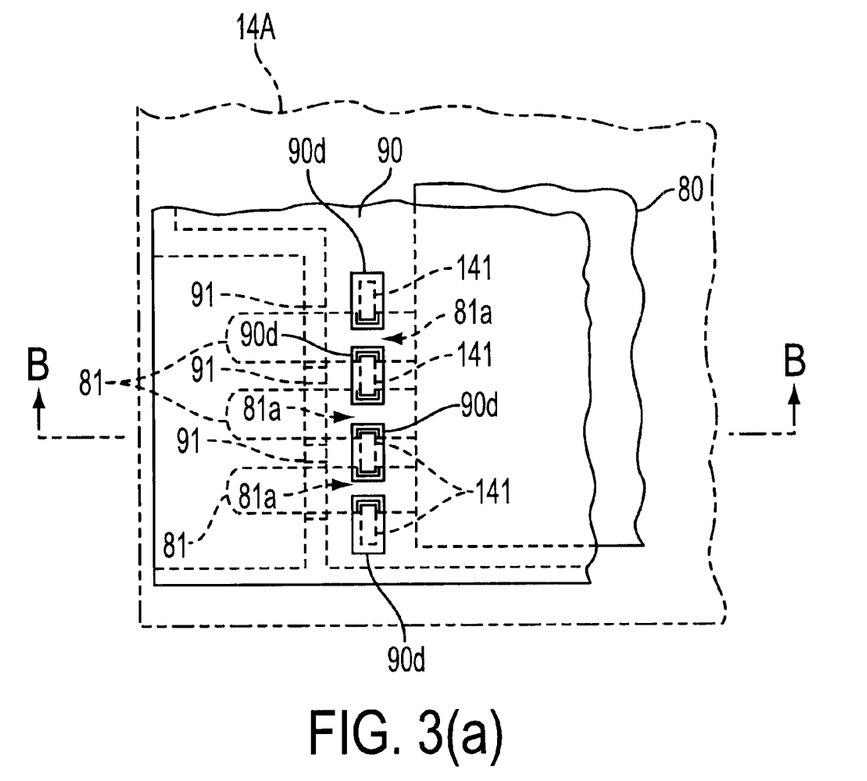
FIG. 3(a) is a front view of the connector in FIG. 1.
Figure 3B:
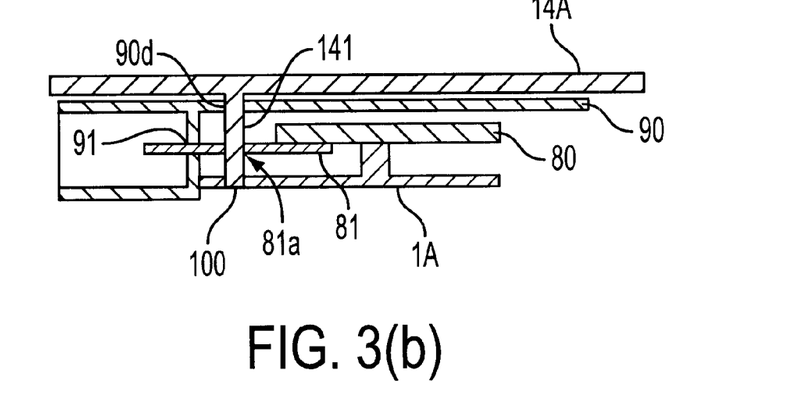
FIG. 3(b) is a sectional view of the connector shown in FIG. 3(a) along the line B—B.

Embodiments of the present invention will be described below with reference to the drawings. In FIGS. 1 to 3 and in the following description, the same reference numerals as those used in FIGS. 7 and 8, which generally show the seatbelt retractor disclosed in Japanese Patent Application No. 11-320875, represent the same component parts.

Figure 6:
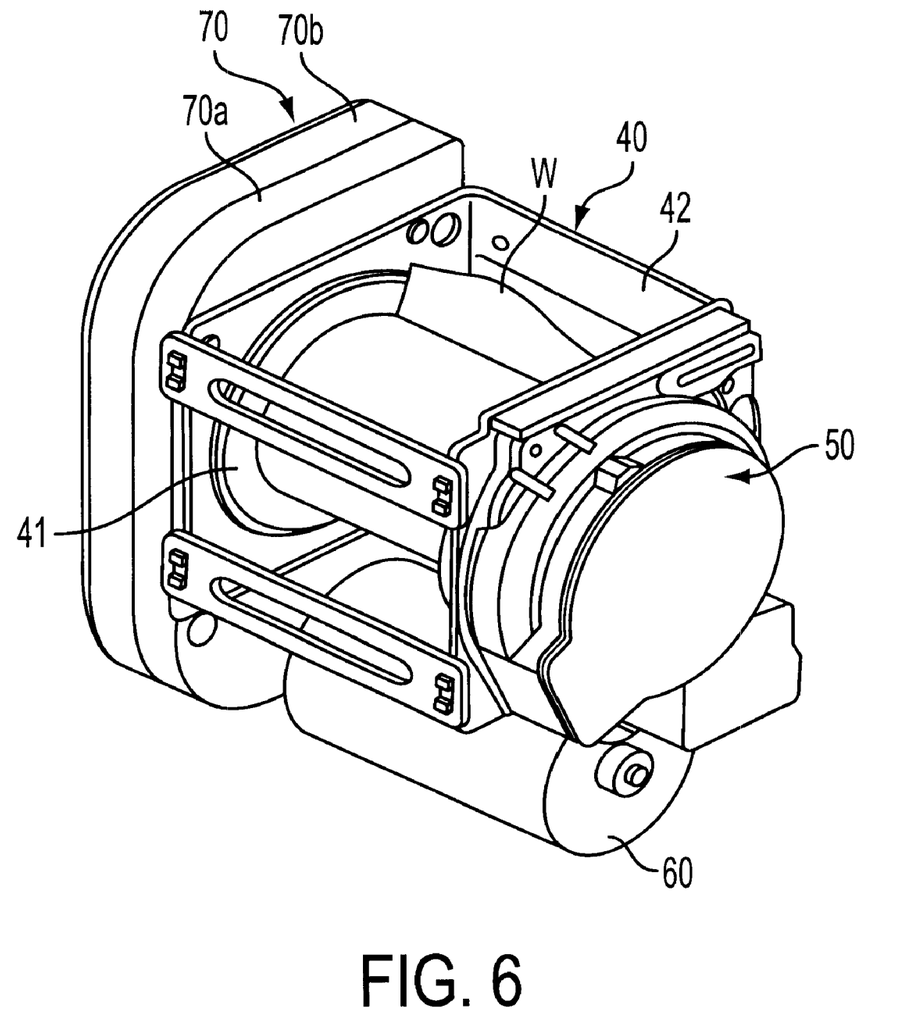
FIG. 6 is a perspective view of a seatbelt retractor.

In order to overcome the problem, an electrical seatbelt retractor has been developed in which an electric motor is used, replacing the return spring or assisting the same, as a driving force source for retracting the webbing to the seatbelt retractor. FIG. 6 is a perspective view of such an electrical seatbelt retractor. The seatbelt retractor includes a webbing-spooling reel unit 40 and a reel-locking structure 50. The webbing-spooling reel unit 40 includes a spool 41 for spooling a webbing W and a base frame 42 for rotatably supporting the spool 41 at the spool axle thereof (not shown). The reel-locking structure 50 (only the exterior view is shown) for stopping the rotation of the spool 41 in an emergency such as a vehicle collision is mounted on the base frame 42 at the outside thereof. The seatbelt retractor is provided with a motor 60 as a rotation-driving-force source for spooling the webbing around the spool 41 and a circuit board (not shown) having a circuit for controlling the motor 60. A speed-reduction structure (not shown) is also provided in a casing 70 including a retainer 70a and a cover 70b, the speed-reduction structure serving as a power transmission structure for transmitting the rotational torque from the motor 60 to the spool 41.

The above electrical seatbelt retractor generally includes a rotational direction determining unit (not shown in FIG. 6) for determining the rotational direction of a spool. The rotational direction determining unit determines whether or not the spool rotates, and determines the rotational direction of the spool when rotating. The motor for rotationally driving the spool is controlled according to the determined value from the rotational direction determining unit.

For example, in the seatbelt retractor shown in FIG. 6, when the rotational direction determining unit determines the rotation of the spool in the direction of the webbing W being drawn by the drawing operation of the passenger or the like, the current to the motor 60 is switched off so that the spool 41 is released from the rotational torque of the motor 60, whereby the webbing W can be drawn out easily. When the webbing W has been drawn out, that is, when the spool 41 stops the rotation in a direction to draw out the webbing W when the passenger completes fastening the seatbelt or the like, the current to the motor 60 is switched on so that the motor 60 is driven to rotate in a direction to spool the webbing, and the excess webbing W drawn out is retracted to the seatbelt retractor until the seatbelt fits the passenger.

Figure 7:
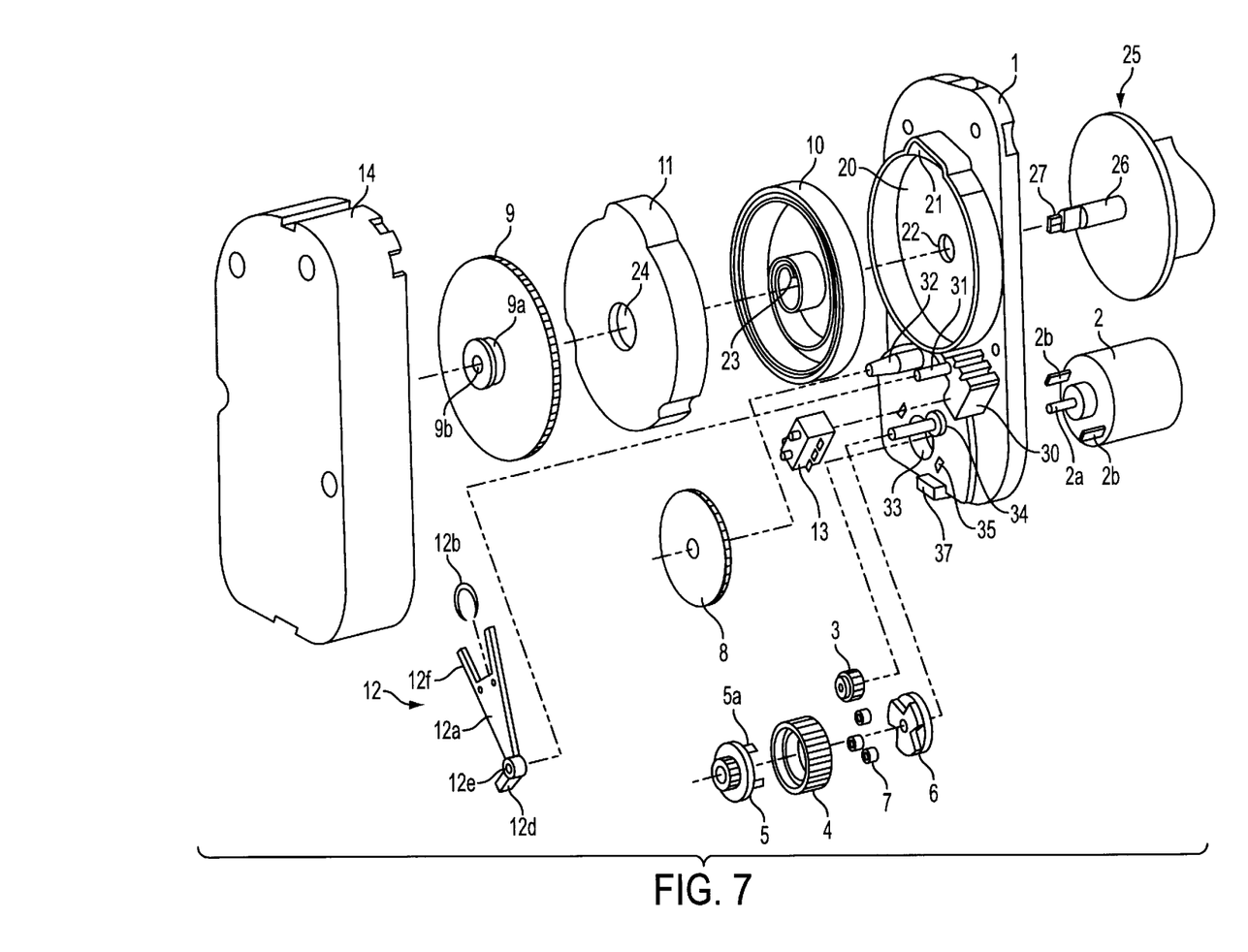
FIG. 7 is an exploded perspective view of another seatbelt retractor.
Figure 8A:
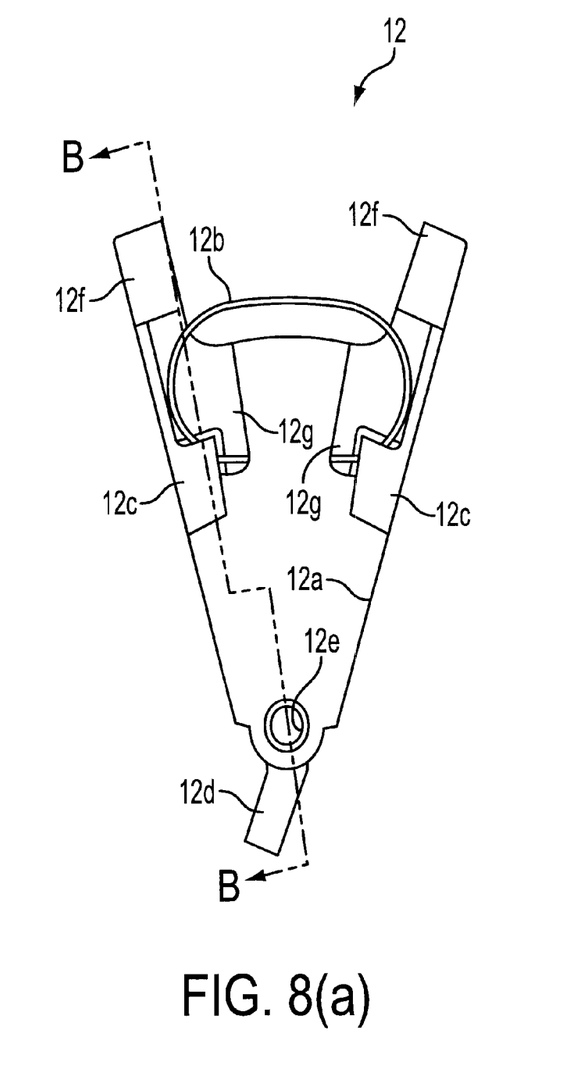
FIG. 8 includes illustrations showing the configuration of a rotational direction determining unit used in the seatbelt retractor shown in FIG. 7.
Figure 8B:
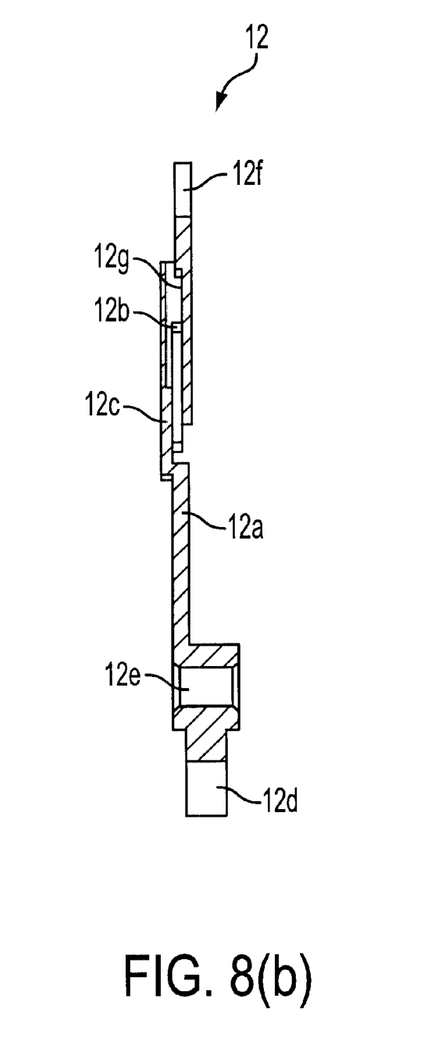

A seatbelt retractor provided with such a rotational direction determining unit was proposed by the applicant of the present invention, as disclosed in, for example, Japanese Patent Application No. 11-320875, which is incorporated by reference herein. FIG. 7 is a perspective view of the seatbelt retractor described in the above application. FIG. 8(a) is a front view of a rotational direction determining unit of the seatbelt retractor. FIG. 8(b) is a sectional view of the rotational direction determining unit shown in FIG. 8(a) along line B—B.

In FIG. 7, the driving force of a motor 2 mounted on a tabular retainer 1 is transmitted from a motor gear 3 to an L-gear 4, to an S-gear 5 via a clutch structure configured with the S-gear 5, a supporting member 6, and rollers 7, and to a push gear 9 from the S-gear 5 via a connector gear 8. A return spring 10 is connected to the rotation axle of the push gear 9, and urges the rotation axle of the push gear 9 in a direction to retract a webbing. A female spline part 9b of the push gear 9 couples with a male spline part 27 of a spool 25 for spooling the webbing. The L-gear 4, the S-gear 5, and the supporting member 6 are coaxially supported by a rotation axle 34 provided on the retainer 1. The connector gear 8 is supported by another rotation axle 32 provided on the retainer 1.

The push gear 9 is provided with a sliding part 9a. A switch spring 12b of a rotational direction determining unit 12 is in resilient contact with the outer periphery of the sliding part 9a. A switch plate 12a pivots clockwise or counterclockwise in accordance with the rotational direction of the push gear 9. When the push gear 9 rotates in the direction to draw out the webbing, a striker 12d of the switch plate 12a pushes a movable tab of a limit switch 13 and puts on the limit switch 13. The limit switch 13 and the switch plate 12a are supported by the retainer 1. The motor 2 rotates in one direction which is the same direction as the urging direction of the return spring 10.

The S-gear 5, the supporting member 6, and the rollers 7 disposed inside the L-gear 4 form a clutch structure. When the push gear 9 is rotated in a direction to draw out the webbing by an external force, the clutch structure disconnects the mechanical power transmission between the L-gear 4 and the S-gear 5 so that the motor 2 does not act as a load when the webbing is drawn out. The clutch structure also disconnects the mechanical power transmission between the L-gear 4 and the S-gear 5 when the motor 2 is not driven to rotate, so that the motor 2 does not act as a load against the retracting force of the return spring 10. When the motor 2 is driven, the driving force is transmitted by the clutch structure to the L-gear 4 and the S-gear 5, and the webbing is retracted by the driving force of the motor 2 and the urging force of the return spring 10 via the push gear 9.

The switch plate 12a is provided with spring-receiving parts 12g which are shallow concave parts, and the switch spring 12b mates with the spring-receiving parts 12g. Holding parts 12c are provided so as to protrude overlapping the spring-receiving parts 12g. The switch spring 12b is held by the holding parts 12c so as not to disengage from the spring plate 12a. The switch spring 12b is resiliently in contact with the sliding part 9a of the push gear 9, and transmits the rotation of the sliding part 9a to the switch plate 12a by the friction between the switch spring 12b and the sliding part 9a.

When the spool 25 rotates in a direction to draw out the webbing, the switch plate 12a pivots on a pivot 31 engaged with a pivot hole 12e, whereby the striker 12d pushes the movable tab of the limit switch 13. Pivoting-angle restricting parts 12f are formed at an end of the switch plate 12a. When the switch plate 12a pivots by a predetermined angle, the pivoting-angle restricting part 12f comes into contact with the outer face of the sliding part 9a, and the switch plate 12a stops pivoting. Although the sliding part 9a rotates slidingly in contact with the switch spring 12b, the switch spring 12b or the sliding part 9a does not wear out because the friction is not significantly large.

A tabular retainer 1 is provided with a circular spring-receiving part 20 at a surface (in some parts hereinafter, referred to as "outer side") thereof. The return spring 10 is received in the spring-receiving part 20. The return spring 10 is anchored to a spring stopper 21 of the spring-receiving part 20 at the outer end of the return spring 10, and is anchored to a bush (not shown) fixed to the outer periphery of a shaft (spool axle) 26 of the spool 25 at an inner end 23 of the return spring 10, whereby the urging force of the return spring 10 is directly transmitted to the spool 25.

The shaft 26 passes through a central hole 22 of the spring-receiving part 20 and a hole 24 of a spring cover 11. The male spline part 27 is formed around the periphery of an end of the shaft 26.

The retainer 1 is provided at the outer side thereof with a mounting part 30 for the limit switch 13. The pivot 31 is projected from the mounting part 30. The switch plate 12a mates with the pivot 31 at the pivot hole 12e thereof.

The motor 2 is disposed at the inner side of the retainer 1. A rotor shaft 2a of the motor 2 passes through a hole 33 formed in the retainer 1, protrudes at the outer side thereof, and is provided with the motor gear 3 fixed to the end of the rotor shaft 2a.

The motor 2 is provided with two nails 2b. The nails 2b pass through openings 35 formed in the retainer 1, and are clinched at the outer side of the retainer 1, thereby fixing the motor 2 to the retainer 1.

In the seatbelt retractor having the above configuration, when the webbing is drawn out by an external force, the push gear 9 rotates in a direction to draw out the webbing. In this case, the mechanical power transmission between the L-gear 4 and the S-gear 5 is disconnected, and the motor 2 does not act as a load against drawing out the webbing. When the motor does not rotate, the mechanical power transmission between the L-gear 4 and the S-gear is also disconnected, and the motor 2 does not act as a load against the retracting force of the return spring 10. When the motor 2 is driven, the driving force is transmitted by the clutch structure to the L-gear 4 and the S-gear 5, and the webbing is retracted by the driving force of the motor 2 and the urging force of the return spring 10 via the push gear 9.

An electrical seatbelt retractor, such as described above, must include a circuit board provided with a circuit for controlling the rotation of a motor. Although the position of the circuit board is not described in Japanese Patent Application No. 11-320875, the electrical seatbelt retractor of this type is generally provided with the circuit board in the cover 14.

In this case, when electrical components such as the limit switch and mechanical components such as the gears are mounted on the retainer 1, the electrical components are positioned and fixed in the same manner as the mechanical components, and are connected by lead wires and the like. Therefore, wiring processes are necessary, thereby requiring a long time in assembly.

In order to eliminate the wiring processes, the electrical components may be fixed to the circuit board before mounting the mechanical components. However, in this case, positioning cannot be accurately performed. Moreover, when the mechanical components are mounted after the electrical components are mounted, the operation must be performed carefully so as not to touch the controlling circuit, which requires a long time to assemble.

The seatbelt retractor includes a spool 25 for spooling a webbing, a motor 2 for driving the spool to rotate in a direction to spool the webbing, and a power transmission structure for transmitting the rotation-driving force of the motor 2 to the spool 25. The motor 2 and the power transmission structure are disposed on a tabular retainer 1A. The retainer 1A is mounted with a circuit board 80 including a circuit for controlling the rotation of the motor 2 and connectors 81 for feeding current, and a rotational direction determining unit 12. The power transmission structure, the circuit board 80, and the rotational direction determining unit 12 are provided on a surface of the outside of the retainer 1A (in some parts hereinafter, referred to as the "outer side"). The retainer 1A is provided with an outer cover 14A for covering the outer side of the surface of the retainer 1A including the power transmission structure, the circuit board 80, the rotational direction determining unit 12, and an inner cover 90 described below.

The retainer 1A, the rotational direction determining unit 12, and the power transmission structure have generally the same configurations as the configurations of those described in the above Japanese Patent Application No. 11-320875 (see FIGS. 7 and 8).

That is, the retainer 1A is provided with a hole 33 for a rotor shaft 2a of the motor 2 passing therethrough, a pair of openings 35 for nails 2b for fixing the motor 2 passing therethrough, and rotation axles 32 and 34 for rotatably supporting gears described below for transmitting power. The rotor shaft 2a and the nails 2b of the motor 2 pass through the corresponding holes 33 and openings 35, and the nails 2b are clinched at the outer side of the retainer 1A, thereby retaining the motor 2 on the retainer 1A. The rotor shaft 2a is provided with a motor gear 3 fixed at the end of the rotor shaft 2 protruding from the outer side of the retainer 1A.

The motor gear 3 engages with an L-gear 4 rotatably supported by the rotation axle 34 including an S-gear 5, a supporting member 6, and rollers 7, thereby forming a clutch structure. The driving force of the motor 2 transmitted to the L-gear 4 is transmitted from the L-gear 4 to the S-gear 5 included in the clutch structure. The driving force is transmitted to a connector gear 8 engaging with the S-gear 5 and rotatably supported by the rotation axle 32, and is transmitted to a push gear 9 engaging with the connector gear 8. By the driving force transmitted from the push gear 9 to a shaft 26 of the spool 25 via a male spline part 27 and a female spline part 9b engaging with each other, the spool 25 is driven to rotate in a direction to spool the webbing.

The above formation of the L-gear 4, the S-gear 5, the supporting member 6, the rollers 7, and the connector gear 8 is generally the same as that is shown in FIGS. 7 and 8, these components not shown in FIG. 1 so as to simplify the drawing. The other configuration of the power transmission structure, the configuration of the rotation-driving structure of the return spring for driving the spool 25, and the operation of the clutch structure 10 are generally the same as those in the seatbelt retractor described in Japanese Patent Application No. 11-320875 and shown in FIGS. 7 and 8.

A mounting part 30A for a limit switch 13A is provided on the outer side of the retainer 1A. The mounting part 30A is provided with a pivot 31 for pivotably supporting a switch plate 12a of the rotational direction determining unit 12, the pivot 31 passing through a pivot hole 12e of the rotational direction determining unit 12. The mounting part 30A is also provided with holding holes 301 formed therein for holding supporting shafts 131 provided on the limit switch 13A.

The switch plate 12a is provided with a switch spring 12b mounted at an end of the switch plate 12a. The switch spring 12b is resiliently in contact with a sliding part 9a of the push gear 9, whereby the rotation of the sliding part 9a is transmitted to the switch spring 12b by the friction between the sliding part 9a and the switch spring 12b. When the spool 25 rotates in a direction to draw out the webbing and the push gear 9 fixed to the spool 25 via the shaft 26 rotates in the same direction, the rotation is transmitted to the switch plate 12a via the switch spring 12b, whereby the switch plate 12a pivots on the pivot 31 inserted in the pivot hole 12e, and a striker 12d pushes a movable tab of the limit switch 13A. The pivoting movement of the switch plate 12a is restricted by pivoting-angle restricting parts 12f provided at an end of the switch plate 12a.

The tabular circuit board 80 overlaps the outer side of the retainer 1A at a portion thereof in which the power-transmitting gears are disposed. The circuit board 80 is provided therein with mating holes 82, 83, and 84 with which the rotation axles 32 and 34 for supporting the power-transmitting gears and the pivot 31 to be inserted in the pivot hole 12e mate, respectively, at ends thereof. The circuit board 80 can accurately be positioned on the retainer 1A by mating the mating holes 82 to 84 with the rotation axles 32 and 34 and the pivot 31, respectively, at the ends thereof when the circuit board 80 and the retainer 1A overlap each other.

The circuit board 80 is provided with through-holes 85 formed therein at positions corresponding to the holding holes 301 of the limit-switch mounting part 30A, the through-holes 85 allowing the supporting shafts 131 of the limit switch 13A to pass therethrough and to be held in the holding holes 301. The limit switch 13A is accurately positioned by the supporting shafts 131 inserted from the outer side of the circuit board 80 through the through-holes 85 and held in the holding holes 301. The limit switch 13A is connected to the circuit board 80 via a resilient member such as a coil spring (not shown). By using the resilient member for connection of the limit switch 13A, lead wires for the limit switch can be eliminated, whereby the time required for wiring processes can be reduced. When a large stress is applied to the limit switch 13A, the stress is reduced, thereby preventing the circuit from damage, disconnections, and the like.

According to the embodiment, the connectors 81 of the circuit board 80 for feeding current protrude from a lower edge (at the lower side in FIG. 1) of the circuit board 80 in a tongue-like shape.

The retainer 1A is provided with the inner cover 90 for covering the circuit board 80. The inner cover 90 includes a main plate 90a for covering the circuit board 80 at the outer side thereof, and a side wall 90b extending substantially in a U-shape so as to enclose a part of the periphery of the circuit board 80, the periphery including a pair of opposing edges thereof (the upper and lower edges of the circuit board 80 shown in FIG. 1, according to the embodiment). The side wall 90b is provided with a pair of projected parallel lines 90c at the inner surface thereof opposing each other and facing the pair of opposing edges of the circuit board 80. The circuit board 80 mates with a groove 92 formed between the pair of projected lines 90c at the periphery of the circuit board 80. The circuit board 80 is affixed by the pair of edges thereof mating with the grooves 92 of the side wall 90b. The inner cover 90 is provided with openings 91 (see FIGS. 2 and 3) for the connectors 81 passing therethrough. The connectors 81 extend toward the outside of the inner cover 90 through these openings.

A method for mounting the circuit board 80 on the retainer 1A in the seatbelt retractor according to the embodiment is described below. The circuit board 80 overlaps the retainer 1A from the outer side of the retainer 1A so that the rotation axles 32 and 34 for supporting the power-transmission gears and the pivot 31 mate with the mating holes 82 to 84, respectively, at ends thereof. The inner cover 90 covers the circuit board 80 in a manner such that the upper and lower edges of the circuit board 80 mate with the groove 92. In this case, the connectors 81 extending from the lower edge of the circuit board 80 pass through the connector-passing openings 91 of the inner cover 90, and extend toward the outside of the inner cover 90. The inner cover 90 is mounted on the retainer 1A. The outer cover 14A is mounted on the retainer 1A so as to cover the outer side of the retainer 1A including the circuit board 80 and the inner cover 90 which covers the circuit board 80. The circuit board 80 is accurately positioned with respect to the retainer 1A and affixed in a proper position by mating the mating holes 82 to 84 with the rotation axles 32 and 34 and the pivot 31, respectively, and the upper and lower edges of the circuit board 80 with the groove 92 of the inner cover 90 mounted on the retainer 1A. Even when the circuit board 80 is mounted on the retainer 1A before the mounting of mechanical components such as the power-transmission gears, the circuit board 80 is not exposed directly to hands, tools, and component parts, with inner cover 90 protecting the circuit board 80, thereby reliably avoiding damage to electrical parts such as the circuit board during manufacture of the seatbelt retractor.

In order to hold the connectors 81 passing through the connector-passing openings 91 of the inner cover 90 and to reliably maintain the connectors 81 in a state extending toward the outside of the openings 91 of the inner cover 90, the outer cover 14A is provided with a plurality of tongue-shaped clipping members 141, as shown in FIGS. 2 and 3, for preventing the connectors 81 from falling off the openings 91. The clipping members 141 extend from the inner side of the outer cover 14A (toward the retainer 1A), are inserted in a direction perpendicular to the extending direction of the connectors 81 into slits 90d formed in the main plate 90a of the inner cover 90, and clip the connectors 81 at both sides of a thinner part 81a formed at a longitudinally intermediate part of each connector 81.

The clipping members 141 extend from the inner side of the outer cover 14A at a predetermined distance between each other so as to be inserted in the slits 90d of the inner cover 90 when the outer cover 14A is disposed to cover the inner cover 90. The clipping members 141 inserted in the slits 90d pass between each connector 81 in a direction perpendicular to the connectors 81, and clip each connector 81 at the thinner part 81a thereof between the adjacent clipping members 141. The ends of the clipping members 141 mate with mating holes 100 provided in the retainer 1A, whereby the clipping members 141 are affixed so as not to be easily deformed by stress when stress is applied in a direction perpendicular to the insertion direction of the clipping members 141.

Each connector 81 is cut away at both sides of a longitudinally intermediate portion, the portion forming the thinner part 81a opposing the other thinner part 81a. Each of the connectors 81 can mate with the adjacent clipping members 141 only at the thinner part 81a of the connector 81. The gap between the sides opposing each other of the adjacent connectors 81 is set so that each clipping member 141 can only pass through the gap between the adjacent thinner parts 81a. With this arrangement, when the circuit board 80 is affixed by the inner cover 90 mounted on the retainer 1A, and the outer cover 14A is mounted on the retainer 1A so as to cover the circuit board 80 and the inner cover 90, the connectors 81 being inserted in the connector-passing openings 91, the clipping members 141 extending from the inner side of the outer cover 14A are inserted into the slits 90d of the inner cover 90 and between the thinner parts 81a opposing each other of the connectors 81, thereby clipping each connector 81 at the thinner part 81a thereof between the adjacent clipping members 141. The ends of the connectors 81 mate with the mating holes 100 of the retainer 1A. With this arrangement, each connector 81 is prevented from falling out of the opening 91 and is firmly held in a state extending from the opening 91 toward the outside of the inner cover 90.

Although according to the above embodiment, the circuit board 80 is affixed by a pair of the edges thereof mating with the groove 92 of the inner cover 90 mounted on the retainer 1A, the method for affixing the circuit board 80 is not limited to this method.

Figure 4:
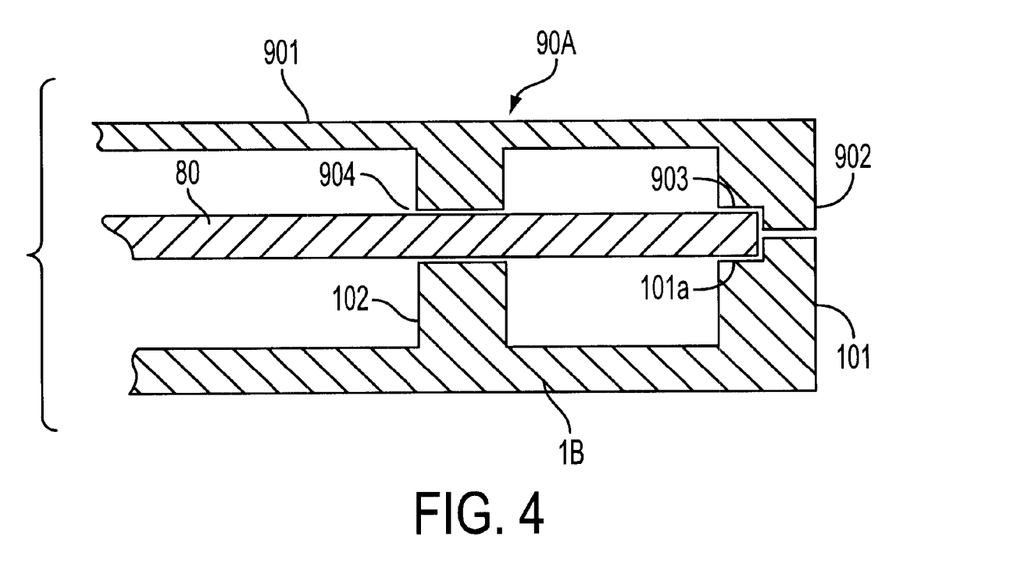
FIG. 4 is a sectional view of a portion of a seatbelt retractor according to another embodiment of the present invention.
Figure 5:
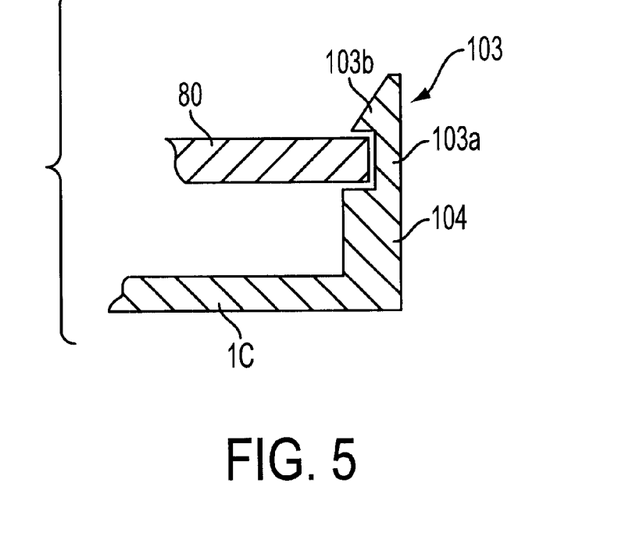
FIG. 5 is a sectional view of a portion of a seatbelt retractor according to still another embodiment of the present invention.

With reference to FIGS. 4 and 5, another method for affixing the circuit board 80 is described below. FIG. 4 is a sectional view, showing a fixing method of the circuit board 80, of a critical portion of a seatbelt retractor according to another embodiment of the present invention. FIG. 5 is a sectional view, showing a fixing method of the circuit board 80, of a critical portion of a seatbelt retractor according to still another embodiment of the present invention. In these drawings, the same reference numerals used in FIGS. 1 to 3 are used to represent the same components.

A retainer 1B shown in FIG. 4 incudes a thick peripheral wall 101 which protrudes from the outer side of the retainer 1B so as to enclose and come into contact with the periphery of the circuit board 80 at the inner side of the periphery thereof, and a supporting wall 102 protruding so as to come into contact with the circuit board 80 at the inner side thereof. The peripheral wall 101 has a step-like recess 101a having a substantially L-shaped cross-section, at the inner side of the end of the peripheral wall 101, with which the circuit board 80 is engaged at the periphery thereof. The circuit board 80 is received by the step-like recess 101a at the periphery of the circuit board 80 by the inner half of the thickness thereof. An inner cover 90A covers the peripheral wall 101 including the circuit board 80.

The inner cover 90A includes a main plate 901 for covering the circuit board 80, and a thick side wall 902 which encloses the periphery of the circuit board 80 and is in contact with the circuit board 80 at the periphery thereof from the outer side of the circuit board 80. The inner cover 90A includes a supporting wall 904 protruding from the inner side of the main plate 901 and coming in contact with the circuit board 80 at the outer side thereof, the supporting wall 904 together with the supporting wall 102 of the retainer 1B clamping the circuit board 80 therebetween.

The side wall 902 of the inner cover 90A has a step-like recess 903 having a substantially L-shaped cross-section, at the inner side of the end of the side wall 902, by which the circuit board 80 is received by the outer half of the thickness of the circuit board 80. The side wall 902 is in contact with the outer side of the end face of the peripheral wall 102 at the outer side of the end face of the side wall 902. The side wall 902 and the peripheral wall 102 are connected by a connecting member (not shown) at the portions in contact with each other.

In the seatbelt retractor thus arranged, the circuit board 80 is firmly affixed by being supported between the step-like recesses 903 and 101a at the periphery of the circuit board 80, and by being clamped by the supporting walls 904 and 102. The circuit board 80 is accurately positioned only by engaging the periphery thereof with the step-like recesses 903 and 101a.

According to the embodiment, the step-like recesses 903 and 101a are formed at the peripheral walls 902 and 101, respectively, the circuit board 80 being supported between the step-like recesses 903 and 101a at the periphery of the circuit board 80. However, the configuration is not limited to this arrangement, and it may be arranged in a manner such that, although not shown, the circuit board 80 is received by a step-like recess formed in the peripheral wall 101 of the retainer 1B by the entire thickness of the periphery of the circuit board 80, thereby eliminating the step-like recess in the side wall 902 of the inner cover 90A. The circuit board 80 is supported between the step-like recess and the end face of the side wall 902 at the periphery of the circuit board 80. The configuration may also be arranged in other ways.

In FIG. 5, a retainer 1C includes a thick peripheral wall 104 which protrudes so as to come into contact with the circuit board 80 at the periphery thereof from the inner side of the circuit board 80, and encloses the circuit board 80 at the periphery thereof. The peripheral wall 104 includes a plurality of fasteners 103 around the circuit board 80 at the end of the peripheral wall 104, for anchoring the periphery of the circuit board 80 to the peripheral wall 104. Each of the fasteners 103 extending upward adjacent to the periphery of the circuit board 80 includes a tongue 103a resiliently deformable in a direction away from the periphery of the circuit board 80, and a nail 103b tapering at an end thereof and projecting at the other end thereof toward the circuit board 80 along the outer side thereof. The circuit board 80 is affixed and is prevented from falling out from the retainer 1C by the end of the peripheral wall 104 being in contact with the circuit board 80 at the inner side of the periphery thereof and the nails 103b projecting along the outer side of the circuit board 80.

For fixing the circuit board 80 to the retainer 1C, the circuit board 80 is first disposed so that the periphery thereof overlaps the peripheral wall 104. In this case, the circuit board 80 comes into contact with the tapered face of each nail 103b and is disposed separated from the end face of the peripheral wall 104 due to the end, projecting toward the inside of the periphery of the circuit board 80, of the nail 103b of each fastener 103. Then, the circuit board 80 is pressed firmly toward the side of the retainer 1C, whereby each tongue 103a of the fasteners 103 is resiliently deformed in a direction separating from the circuit board 80 and the circuit board 80 can move toward the retainer 1C with the periphery of the circuit board 80 sliding along the tapered face. The circuit board 80 comes into contact with the end of the peripheral wall 104 at the inner side of the periphery of the circuit board 80 by further firmly pressing the circuit board 80 so as to climb over the nails 103b at the periphery of the circuit board 80. Immediately after the periphery of the circuit board 80 climbs over the nails 103b, each tongue 103a of the fasteners 103 is resiliently restored toward the circuit board 80 by the restoring force, whereby the end of the nails 103b move along the outer side of the circuit board 80 so as to prevent the circuit board 80 from falling out from the retainer 1C, thereby affixing the circuit board 80.

As described above, the seatbelt retractor according to the present invention offers the following superior advantages. Wiring processes of lead wires in a cover of a casing are not required, thereby reducing the number of the components and greatly reducing labor in assembly processes. Electronic devices such as a circuit board can be positioned with accuracy with respect to the retainer. When mechanical components are mounted after the circuit board is mounted on the retainer, the circuit board previously mounted is not touched by hands, tools, and other component parts.

While particular embodiments according to the invention have been illustrated and described above, it will be clear that the invention can take a variety of forms and embodiments within the scope of the appended claims.

What is claimed is:

1. A seatbelt retractor comprising:

a spool for spooling a webbing;

a motor for driving the spool to rotate in a direction to spool the webbing;

a power transmission structure for transmitting the rotational driving force of the motor to the spool;

a circuit board provided with a circuit for controlling the rotation of the motor and connectors for feeding current;

a rotational direction determining unit for determining the rotational direction of the spool; and a retainer for mounting the motor, the power transmission structure, the circuit board, and the rotational direction determining unit on a surface thereof; and, an outer cover mounted on the retainer to cover the surface of the retainer including the power transmission structure, the circuit board, and the rotational direction determining unit; and wherein the rotational direction determining unit comprises a limit switch mounted on the circuit board via a resilient member.

2. The seatbelt retractor of claim 1, further comprising an inner cover for covering the circuit board and wherein the outer cover covers the inner cover.

3. The seatbelt retractor of claim 2, wherein the connectors extend from an edge of the circuit board, pass through connector-passing openings formed in the inner cover, and extend toward the outside of the inner cover.

4. The seatbelt retractor of claim 1, wherein the connectors extend from an edge of the circuit board, pass through connector-passing openings formed in the inner cover, and extend toward the outside of the inner cover.

5. A passenger-protecting apparatus comprising:

a spool for spooling a webbing;

a motor for driving the spool to rotate in a direction to spool the webbing;

a power transmission structure for transmitting the rotational driving force of the motor to the spool;

a circuit board provided with a circuit for controlling the rotation of the motor and connectors for feeding current;

a rotational direction determining unit for determining the rotational direction of the spool; and a retainer for mounting the motor, the power transmission structure, the circuit board, and the rotational direction determining unit on a surface thereof;

an outer cover mounted on the retainer to cover the surface of the retainer including the power transmission structure, the circuit board, and the rotational direction determining unit; and, an inner cover for covering the circuit board and wherein the outer cover covers the inner cover.

6. The passenger protecting apparatus of claim 5, wherein the circuit board is anchored to a groove formed in the inner cover.

7. The passenger-protecting apparatus of claim 6, wherein the connectors extend from an edge of the circuit board, pass through connector-passing openings formed in the inner cover, and extend toward the outside of the inner cover.

8. The passenger protecting apparatus of claim 7, wherein the rotational direction determining unit comprises a limit switch mounted on the circuit board via a resilient member.

9. The passenger protecting apparatus of claim 5, wherein the circuit board is clamped by the retainer and the inner cover.

10. The passenger-protecting apparatus of claim 9, wherein the connectors extend from an edge of the circuit board, pass through connector-passing openings formed in the inner cover, and extend toward the outside of the inner cover.

11. The passenger protecting apparatus of claim 10, wherein the rotational direction determining unit comprises a limit switch the circuit board via a resilient member.

\* \* \* \* \*